(12) United States Patent
DiMarino

(10) Patent No.: US 10,631,960 B2
(45) Date of Patent: Apr. 28, 2020

(54) DENTAL IMPRESSION MODEL SYSTEM, APPARATUS, AND METHOD

(71) Applicant: James C. DiMarino, Woodbury, NJ (US)

(72) Inventor: James C. DiMarino, Woodbury, NJ (US)

(*) Notice: Subject to any disclaimer, the term of this patent is extended or adjusted under 35 U.S.C. 154(b) by 0 days.

(21) Appl. No.: 14/634,706

(22) Filed: Feb. 27, 2015

(65) Prior Publication Data

US 2016/0250004 A1 Sep. 1, 2016

(51) Int. Cl.
*A61C 9/00* (2006.01)
*A61C 19/02* (2006.01)

(52) U.S. Cl.
CPC ............ *A61C 9/0006* (2013.01); *A61C 19/02* (2013.01)

(58) Field of Classification Search
None
See application file for complete search history.

*Primary Examiner* — Brian T Gedeon

(57) ABSTRACT

Embodiments of this invention provide predictability and standardization in the field creating dental models. Embodiments of the invention are capable of accommodating multiple variations and goals of dental impressions, including but not limited to creating dental models for study models, mouth guards, night guards, whitening trays, sleep apnea/snoring devices, etc. Embodiments may incorporate single arch and dual arch impression trays, as well as base model formers and articulators, among other devices of varying shapes, dimensions, sizes and manufacturers. Embodiments of the invention use standard dimensions for accommodating various components. To adapt embodiments of the invention for multiple purposes, and to standardize the process, embodiments of the invention include a shell that allows for standardized dental models to be suspended in the shell during the process of creating dental molds, creating a reservoir for the dental mold. Embodiments allow for a trimming process where impressions are standardized by cutting away lateral excess impression material by running a knife along the lateral portion of upper and lower impression tray walls, and then by trimming away vertical excess by placing the tray into the vertical excess trimming device. In these embodiments, dental impressions and embodiments of a predetermined shell allow dental models to be created, including articulated models, in a simplified process.

The present invention thus allows dental professionals to easily pour up single and double arch dental impressions, create base models, and, optionally, articulate models in fewer steps than currently available, allowing less waste, material, and use of time than traditional and current methods.

23 Claims, 3 Drawing Sheets

DENTAL IMPRESSION MODEL SYSTEM, APPARATUS, AND METHOD

CROSS REFERENCE

This patent application claims the benefit of provisional patent application 61/945,248, titled Dental Impression Model Composition, Apparatus, and Method, which is hereby incorporated by reference in its entirety.

FIELD OF THE INVENTION

In the field of dentistry, a dental impression is a negative imprint of hard and soft tissues (teeth and gums, generally) in the mouth from which a positive reproduction of the oral anatomy can be formed. The present invention allows dental professionals to more efficiently create positive reproductions from negative imprints of single and double arch dental impressions, and from these positive reproductions, create base models, with optional articulation of the base models, in fewer steps than are currently used in the profession, and with less waste.

DESCRIPTION OF THE RELATED ART

The current state of the art for processing dental impressions includes multiple steps for pouring up negative impressions, creating positive casting, forming one of several types of model bases, and articulating single arch, double arch, and similar dental models, and articulating them.

Generally, to begin the process, a dentist or dental technician may provide the patient with a single or dual arch impression tray in the step of creating the negative impression. With a dual arch impression tray, a dentist or dental technician will add impression material to both sides of the impression tray. In the dual arch tray impression technique, both negative impressions (the maxillary impression and the mandibular impression as well as the bite registration impression) may be created at once. A patient may bite down into the dual arch impression tray which retains dental impression material on the upper and lower portions of the tray, allowing for both negative impressions to be created simultaneously. This allows a patient to create both an upper and a lower dentate arch using one impression tray and one mix of impression material which saves the dental technician costly chair time while also reducing waste. After the negative impression has been formed, the dual arch impression tray, with the negative impressions, is removed from the patient's mouth. A dental model material is mixed and is poured over one side of the tray, for example, the upper impression, to create a positive reproduction of the upper dental anatomy. When that first side hardens, the tray is flipped and the cast material is poured over the other side, for example, the lower negative impression, creating a positive cast of the lower dental anatomy. The process extends the time for creating positive castings to a greater length than if separate, single arch mandibular and maxillary negative impressions were poured up which would simultaneously create two positive casts from one mix of modeling material.

Because creating the negative impression in the office using one mix of impression material and one dual arch impression tray saves dental professionals costly chair time in the office than taking a single arch upper impression, a single arch lower impression, and a bite registration, many dental professionals choose to use the dual arch impression trays rather than single arch impression trays. Conversely, because creation of two positive impression from one dual arch tray takes more time in the dental laboratory than creating the positive impression from two single arch trays, some dental professionals choose to use two single impression trays to capture the desired oral anatomy.

That is, as the alternative to the dual arch tray, a dentist or technician may prefer to create one single lower and one single upper dentate arch impression at a time despite the fact this process will take longer for the patient and the dental technician and tie up costly chair time. When creating a single upper and single lower negative impression, a dental professional must hold the impression tray still in the patient's mouth while the impression material sets in order to reduce distortion. The tray holds the malleable impression material against the only upper, or lower, portion of a patient's mouth, to create a negative impression of the upper or lower dental anatomy. This technique consumes their time and lengthens the patient's presence in the chair which prevents the dental professional from seeing other patient's until all three impressions are completed.

A dentist or technician may prefer to use a dual arch impression tray to capture the upper and lower impression and bite registration all in one step using one mix of impression material. When creating a dual arch negative impression, a dental professional simply loads the impression material into the impression tray, places the impression tray into the patient's mouth as if they were taking a single arch impression and asks the patient to bite into the impression material. Once the tray is properly positioned and the patient has bitten into the impression material, the operator is free to perform other productive tasks such as attending to the patient to make sure they are comfortable, providing patient suction, etc., since the patient's bite holds the impression tray in position while the impression material sets. Patient comfort, for example, is critical to creating an accurate and precise negative impression. During this process, the tray can hold the malleable impression material against both the upper and lower portion of a patient's oral anatomy, to simultaneously create a negative impression of the upper and lower dental anatomy.

When using a dual arch impression tray, the dental professional requires less of the costly chair time to create the negative impressions, and generally more of the less expensive lab time to create the dental models, because only one side of the dual arch impression tray can be poured up at one time. However, this causes many dental professionals to not use, for example, a dual full arch impression tray— they often prefer to not return to the office after closing hours to pour up the other side to ensure the other side is ready the following morning.

If using a dual arch impression tray, the operator must wait for the first positive cast from one side of the dual arch impression tray to completely set before pouring up the opposite arch and completing the same steps for the opposite side of the dual arch impression tray.

Restated, when two single arch impression trays are used, the dental professional needs more time to create the negative impressions while the patient is present in the dental office, which is costly to the office, but generally less time to create the dental models because both positive casts or molds may be created at one time from one mix of modeling material.

Additional mechanisms for creating negative dental impressions, and forming those impressions into positive casts or moulds, are well-known in the art.

Currently, when either single or dual trays are used to create negative impressions, and from those negative impressions, the positive casts or moulds are formed, dentists and dental technicians do not have a sufficiently efficient way to re-align the bite to the patient's natural or preferred bite position.

Articulation concerns mimicking the contact relationship of the occlusal surfaces of the upper and lower teeth when moving into and away from centric occlusion, but in a positive cast or mold. Typically, once a model material has set for the second side of a dual arch impression and the model base has been trimmed, if necessary, the models may then need to be articulated in order to allow the dental professional or laboratory to fabricate a dental restoration, appliance, or other modeling need.

Typically, articulating material must be mixed and applied to one side of the model (either the maxillary or mandibular), which is then attached to the articulator. Sometimes the same articulating material mixture can be used to attach the other side of the model to the articulator, or, Sometimes the operator will allow the articulating material to set completely for the first arch before repeating the steps for the other model. Each of the aforementioned steps requires time to mix the material, apply the material correctly, trim the material, allow the material to set, and clean up the tools used to mix the material. The attention of the dental professional to complete each step of the process before the impression produces a viable, articulated, or not articulated, dental model before it is ready for use is quite time consuming and involves many steps.

Each step can introduce error into the system with the introduction of impression, modeling, and articulating materials which can distort over time which can lead to misaligned or distorted models which can result in ill-fitting dental restorations, appliances, etc. Therefore, it is important that the dental professionals process these impressions quickly and efficiently in order to decrease the chance of creating distorted or misaligned dental models.

There are many types of impression trays including but not limited to single arch, dual arch, full mouth, quadrant, sextant, anterior, posterior, ¾ arch, etc, materials, articulators, etc, which can be used and different ways to pour up and create model bases.

A common way to accomplish these tasks is as follows:
i. For Single Arch Impressions:
   a. Measure the impression modeling material (which may be a powder), measure the liquid, mix the modeling material with the water, and pour up the maxillary and mandibular impressions. Then use the modeling material to fill an appropriate model base former for each (of which there are many such as but not limited to: study model base former, orthodontic model base former, whitening tray base former, etc) and insert the impression into the modeling base former. This process can take about 5-10+ minutes per impression set (maxillary impression and mandibular impression) depending on the operator's experience.
   b. Wait for the modeling material to completely set. This process can take 5 minutes (fast set) to 15+ minutes (slow set) depending on the modeling material, water temperature, air temperature, and the operator's experience.
   c. Separate the stone models from the dental impressions which can take anywhere from 2-5+ minutes depending on the operator's experience.
   d. Trim the excess modeling material to create a presentable model which can take about 3-8+ minutes depending on the operator's experience.

ii. For Dual Arch Impressions:
   a. Measure the impression modeling material (which may be a powder), measure the liquid, mix the modeling material with the water, and pour up the maxillary impression. Then use the modeling material to fill an appropriate model base former for each (of which there are many such as but not limited to: study model base former, orthodontic model base former, whitening tray base former, etc) and insert the impression into the modeling base former. This process can take about 5-10+ minutes depending on the operator's experience.
   b. Wait for the maxillary modeling material to completely set. This process can take 5 minutes (fast set) to 15+ minutes (slow set) depending on the modeling material, water temperature, air temperature, and the operator's experience.
   c. Repeat steps a and b for the mandibular impression.
   d. Separate the stone models from the dental impressions which can take anywhere from 2-5+ minutes depending on the operator's experience.
   e. Trim the excess modeling material to create presentable models which can take about 3-8+ minutes depending on the operator's experience.
   f. Dental professionals may choose to complete the mandibular model first if desired, these steps are merely to show what is involved.

Next, the maxillary and mandibular models may need to be mounted on an articulator using an articulating material like dental plaster. A common way to mount models is as follows, with estimated time ranges depending on the operator's experience, using a common articulating material, dental plaster:
   i. The plaster/water is measured, mixed and used to mount the mandibular model on to the articulator which may take about 5-10+ minutes.
   ii. The articulating material is then trimmed/shaped in order to remove any excess material from the first model, which may take about 1-5+ minutes.
   iii. The bite registration is placed on the mandibular arch. The maxillary impression is then placed into the bite registration, which may take 1-3+ minutes.
   iv. A second mixture of plaster/water is then measured, mixed and used to mount the maxillary arch on to the articulator, which may take about 5-10+ minutes.
   v. The articulating material is then trimmed/shaped in order to remove any excess material from the second model, which may take 1-5+ minutes.
   vi. The articulating material is then allowed to completely set, which may take a significant amount of time, depending on the material used.

Dental professionals may choose to articulate the maxillary model first if desired, these steps are merely to show what is involved.

These steps require time for preparation, mixing, applying, and trimming/shaping in addition to the aforementioned time required to pour up the impressions, and to create, trim, and articulate the dental models. Additionally, these steps require participation from the dental office staff to complete while they juggle their other responsibilities. An easier way to pour up, create model bases, and articulate dental impressions would allow offices to use less time and staff resources which will allow the office to become more productive and efficient, and provide more accurate dental impression products for patients.

Additional problems in using a two part system is that a seam may be created which allows the fluid modeling material to flow through and out of the system which does not provide a complete replica of the impression since the material which is supposed to take up the space in the impression, flows through the seam and out of the former creating voids and a mess.

A benefit to the dental profession could include reducing excessive chair time, that is, reducing time for a patient waiting in the dental professional's chair or treatment room, and the like. Excessive waiting time creates increased burdens and costs for dental professionals. Reducing so-called chair time can increase dental professional's time to better serve patients, permit them to use this time to perform revenue generating procedures, pay additional moneys to dental professionals including technicians, and reduce waste.

SUMMARY

Dental offices can have a significant number of impressions to pour up and perhaps articulate each day. Various embodiments of this invention save the office staff a significant amount of time, money, and material costs which will then free them up to be more efficient and productive.

For the cases in which a dual arch impression has been taken (an upper and lower impression at the same time), only one arch can be poured up at a time since the modeling material requires time to set before the impression is able to be turned over to pour up the opposing impression.

There are several challenges to overcome if one wants to pour up both arches of a dual arch impression at the same time.

Attempts have been made to create a way to pour both arches up at the same time but have faults which can result in problems such as but not limited to: inaccurate models, too much excess modeling material which requires time to grind away, and/or modeling material running through a former causing a mess and an incomplete model.

Another major problem to overcome is that there are many competing impression trays, model base formers and articulators of various shapes and sizes which makes it challenging to find a former that can accommodate these various configurations. This invention has found a way to incorporate dental impression model systems, various apparatuses, and methods which can work with multiple impression trays, model bases, and articulators.

Furthermore, no two patient impressions are exactly the same in the amount of impression material used, the amount of material overflowing the impression tray, and the anatomy captured.

These aforementioned factors make it difficult to create a universal method of pouring up dental impressions, base forming, and articulating models.

Embodiments of this invention overcome challenges present in current impression trays, model base formers and articulators of various shapes and sizes.

This invention identifies common dimensions in products that, in embodiments of the invention, allow it to securely hold impression trays and articulators in position for creating dental models and optionally articulating them while also properly forming model bases of various configurations. Embodiments of this invention can be customized to work with most impression trays, model base forms desired, and/or articulating systems, as well as the different shapes within each, including full arch, dual arch, single arch, quadrant, sextant, anterior, posterior, three-quarter arch impression trays, and similar devices known to those having skill in the field.

Typical procedures require excessive time, labor, cost, and sometimes patient discomfort, while the numerous steps create many opportunities for inaccuracy of impressions and dental models. Embodiments of this invention reduce these problems.

In order to capture an impression of the desired anatomy, dental professionals use dual arch dental impression trays to carry impression material to the patient's mouth and allow them to close unobstructed into their natural bite. Once the impression material has set, the patient opens his/her mouth to release the dental impression. The impression material has now captured the desired anatomy and can be used in conjunction with this invention to reduce the time it takes to create a fully formed and articulated dental model replicating a patient's dental anatomy, or portions of dental anatomy.

In the dental field there are numerous shaped and different-sized impression trays with different overall dimensions. Embodiments of this invention allow consolidation of these impression trays into one casting housing (FIG. 1, 2) for the curing and hardening process, based on the dimensions that are consistent between many impression trays and which can be customized to accommodate specific dimensions.

In order to increase the versatility of the aforementioned system so that each accommodates as many devices as possible, features within embodiments allow for variations. For example, a hole may be cut in an embodiment of this invention to allow the impression tray to be altered within the device to correct operator error due to a misaligned midline.

In an embodiment, a variable may be used to alter a tray housing, tray, or articulator, to create a result understood to those having skill in the art. By way of examples and not limitation, alterations could include a blocking feature on a tray housing, or articulator which restricts the flow of modeling material into areas of the housing, as if restricting liquid flow into a reservoir; blocking out undercuts, or correcting deficiencies in an impression that could cause an undesirable result in the final model. Alternative variables include adding impression material to an impression to create a desired result, including customization to provide symmetrical or predetermined impression models and bases in size and depth.

The casting housing may have a perforated section (201) along the enclosed portion of the casting housing which holds an impression tray stem. By removing the perforated section, the housing may accommodate wider or longer types of tray designs or also permit the operator to align any impression that contains a midline which becomes misaligned, for example during the impression-taking process, or immediately before the hardening and curing process, after which time the operator cannot change the orientation. The enclosure may also serve to prevent the escape of dental modeling material, as the operator desires, depending on the viscosity of various modeling compounds at different stages of the hardening and curing process.

For some impression trays, tray housing's enclosure surrounds the handle tightly to help stabilize the tray positioning within the housing, preventing misalignment of the impression tray from the predetermined midline of the horizontal plane.

The casting housing may further have at least one perforated section (202) for tearing away and removal of the surface of the casting housing from the dental models after hardening. The casting housing may then be discarded.

Embodiments of the casting housing may include a casting housing of either predetermined depth or of a generalpurpose depth with variables for blocking or adjusting depth for an upper or lower impression, or both impressions simultaneously. By way of example and not limitation, the operator may pour up impressions and create a thin base, pour up impressions and create a moderate base, pour up impressions and create a thick base, pour up impressions, create a thin base and articulate, pour up impressions, create a moderate base and articulate, or pour up impressions, create a thick base and articulate.

Although the embodiments shown and described herein are for dental impressions, there can be embodiments created for uses outside of dentistry to include but not limited to medical, veterinary, and consumer purposes.

Embodiments provide benefits over the historic lengthy process required to create the desired articulated model, including repeated steps requiring significant time for repeated hardening or curing processes, and further reducing costs because there is only one mix of impression material to simultaneously create an upper impression, lower impression, and bite registration and one mix of modeling material to pour up the upper impression and create a model base, pour up the lower impression and create a model base, and articulate both dental models which reduces the chance for distortion and operator error using this quicker process.

DETAILED DESCRIPTION

Figure 1:
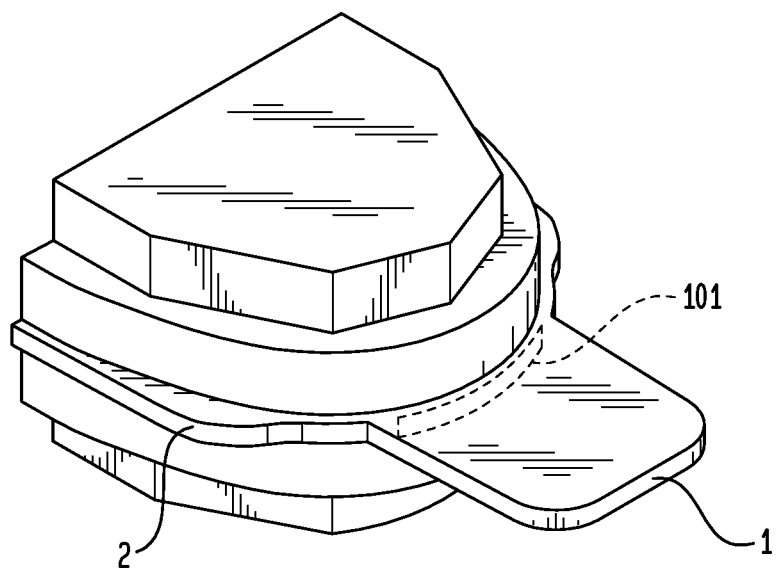
FIG. 1 is an embodiment of a casting housing.

A casting model housing as in FIG. 1 is used to receive at least a partial dental impression of a dental patient's maxillary and mandibular oral anatomy, and potentially incorporate an articulator to register the patient's bite—or how the maxillary and mandibular teeth come together. This exemplary casting housing is used to create a model of what dental professionals hope to replicate through the process of taking an impression of at least a portion of a patient's maxillary and mandibular anatomy as well as the bite registration, pouring up the impressions, forming the bases and articulating them so that they can use the replica for a variety of reasons such as but not limited to: planning the patient's treatment, creating dental appliances such as but not limited to removable partial dentures, custom trays, tooth whitening trays, mouth guards, night guards, etc.

One embodiment of this invention may require as little as one mix of dental modeling material to pour up the maxillary and mandibular, create model bases for, and mount both impressions onto an articulator in the same time it would take to pour up and create model bases for one side of a dual arch impression with less material, waste, time, need for trimming, and expense.

Among other benefits, embodiments may save a significant amount of time and materials per impression set because it may pour up the maxillary and mandibular impressions, create a proper maxillary and mandibular model base, and/or articulate the models all in the same amount of time it would take to pour up one single arch impression.

An embodiment of this invention includes a casting housing of predetermined dimensions, with several optional adapters, that will allow the user to use a casting housing (FIG. 1, 2) and the desired adapters to seat, for example, a dual arch impression tray, seat an articulator if desired, pour up the impressions, and harden and cure the models.

A dental casting system, tray housing, and method for dental casting is described. Embodiments of the system include a tray configured to hold single, dual, or other arch impressions of a patient's oral anatomy. These impressions comprise a negative impression of a portion of a patient's dental anatomy. The tray has an anterior handle and may contain at least one nodule or protrusion along the buccal wall. For some trays, the handle will be located to the side, rather than directly before central incisors; any casting housing receptacles will be appropriately positioned in a casting housing to receive the tray handle.

In the system, a tray housing (FIG. 1, 2) acts as a reservoir for dental modeling material, and receives the dental impression tray. The tray housing receives the tray's handle at 101, for example an anterior handle, and may include a receptacle 2 to receive at least one male buccal protrusion or nodule. Such a female receptacle 2 may grip buccal nodule(s) on an impression tray and maintain a grip on the nodule through friction. The buccal nodule receptacle 2, and the stem or handle (e.g., an anterior stem), which may also be held through friction in a receptacle enclosure 1, together may maintain symmetry and proper spacing of the tray within the tray housing.

Figure 3:
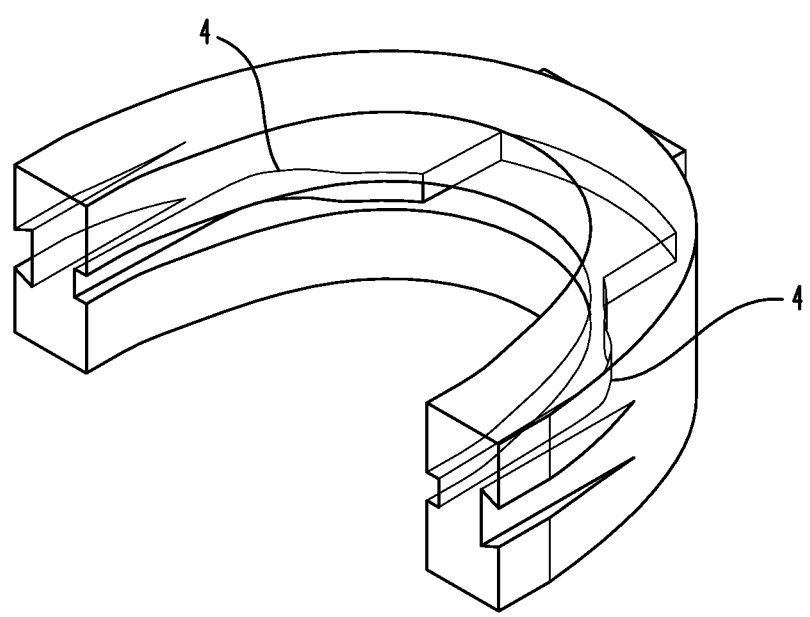
FIG. 3 is a view of an embodiment of a cutting and shaping mold.

After receiving the impression tray, the impression may overflow, and excess impression material may need to be removed in a cutter (FIG. 3).

Figure 4:
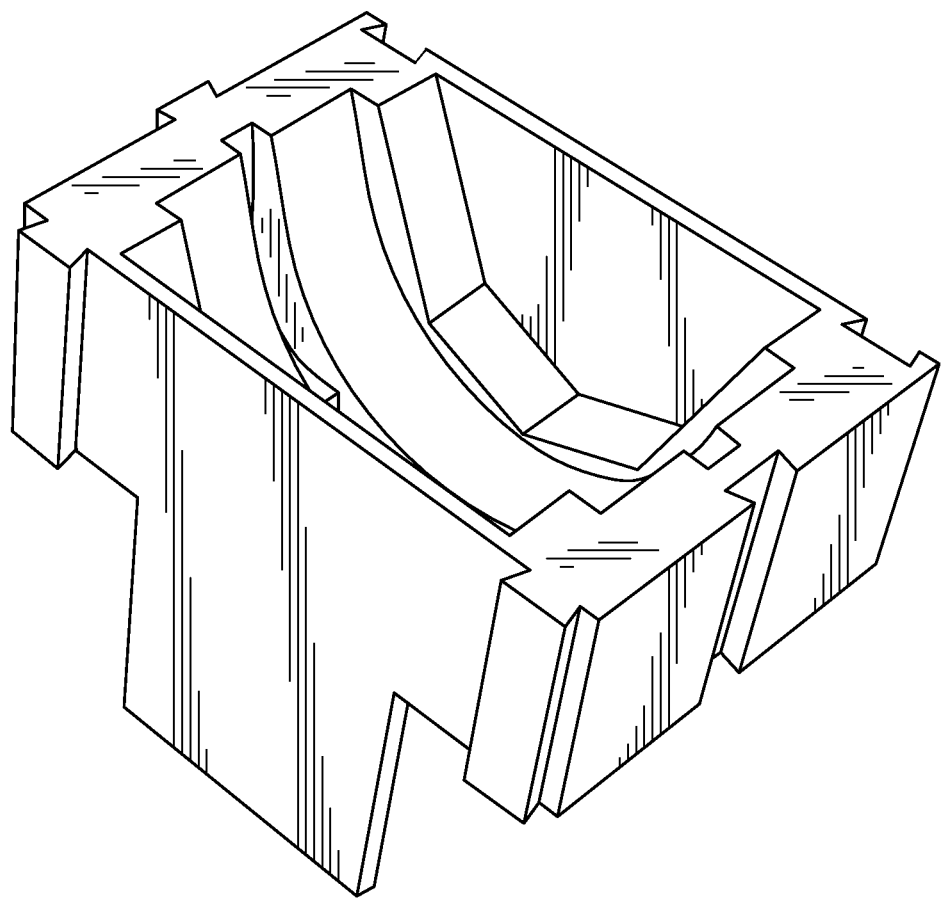
FIG. 4 is an embodiment of a holder for the casting housing during the curing and hardening process.

After removing excess impression material and adding modeling material to the casting housing, the casting housing may be placed in a casting housing holder (FIG. 4), while a handle and its receptacle in the casting housing maintains the impression tray in a predetermined horizontal and vertical orientation to produce the proper dimensions of the modeling bases during the dental modeling hardening and curing process. A female buccal receptacle 2 in the housing further helps to maintain the impression tray in a predetermined orientation to produce the proper dimensions of the modeling bases during the dental modeling hardening and curing process if a buccal projection is present on the impression tray.

In embodiments applicable to general application for dental modeling, the tray housing has inferior and superior walls, where the interior border of the inferior 5 and superior 6 walls are between approximately 40 to 60 mm apart. Embodiments may have inferior 5 and superior 6 interior walls that are not equi-distant from the midline of the housing, in order to meet certain dental modeling goals. For example, the range may be from 10 mm to 80+ mm from inferior 5 to superior 6 interior walls. That is, in alternative embodiments, such as for bleaching models which typically employ thin model bases, the tray housing's inferior-to-midline distance will be approximately 10 mm to 30 mm. However, orthodontic model bases may be thicker, therefore the tray housing's inferior 5-to-midline distance (for certain mandibular models), or superior 6-to-midline distance (for maxillary models), may be greater.

By way of further explanation, for example, orthodontic models may require a maxillary base thickness of about 5 mm to 40(+) mm, and a mandibular base thickness of 5 mm to 40(+) mm but each base does not have to both be the same. For either predetermined requirement, embodiments of the tray housing in this invention will hold the tray at the proper midline of the tray in the proper horizontal orientation so that the casting housing can be made such that the maxillary and mandibular bases can be made to a desired, predetermined thickness. Embodiments of this invention could have the inferior aspects of the casting houses equidistant or different distances from the midline of the tray so that the invention can make at least but not limited to bleaching models with minimal model bases, mouthguard models with moderately thick model bases and/or thick orthodontic model bases, and other models, including but not limited to tooth whitening trays, mouth guards, therapeutic impression trays, medicament delivery trays, night guards, snore guards, sleep/snore medicine appliances, sleep apnea devices, orthodontic models, and study models.

Embodiments of the tray housing may have a width dimension from the stem receptacle to the mouth of the casting housing, about 50 mm to 100 mm or more, and still provide sufficient dimensions for receiving impression trays for children or adults. For illustrative purposes, a dimension of about 63.5 mm from stem receptacle 101 to mouth of the casting housing may accurately house a dental impression tray for children and for adults, because the anterior portion, including the handle, of impression trays for various ages and dental anatomies, are similar. However, the dimension range may be further reduced, for example, for receiving impression trays for children, or enlarged, for larger adults.

An embodiment of the casting housing may allow, for example, about 60 mm between the interior aspects of the superior 6 and inferior 5 opposing walls, where the casting housing allows approximately 10 to 15 mm for the superior and inferior portions of an articulator to enter the casting housing, where the articulator abuts the superior 6 and inferior 5 opposing walls. In this example, the impression tray, with the impression where the excess impression material is removed through aid of a cutter, could have a width of about 25 mm to about 30 mm, where the width is a distance from the inferior to superior planes. The distance from the mouth of the casting housing, which housing acts as a reservoir during the curing or hardening process, and a receptacle 101 could be about 60 mm to 65 mm, and accommodate tray housings ranging from sizes for adults to sizes for children. Optionally, a buccal nodule receptacle in the casting housing could have a width of about 6 to about 7 mm. The buccal nodule receptacle 2 could receive protrusions, perches points, finger rests, or other protrusions or nodules on impression trays. In an embodiment, a nodule receptacle would protrude away from the housing to receive approximately 4 mm of a protrusion. These ranges are by way of example and not requirement.

In embodiments of the invention, the tray anterior receptacle 101 will provide access to an open space, where an enclosure 1 is not present, and the casting housing ends at opening 101. The reservoir will either not leak, or leak minimal an acceptable amount of dental modeling material, due to facial walls of the dental tray abutting the reservoir's internal walls. Alternatively, to further ensure against leakage of dental modeling material, the anterior receptacle 1 will be enclosed around the tray's handle or a modeling putty can be used to seal an opening 101 in the casting housing around the tray's handle. If necessary, when a full arch, anterior, or ¾ full arch impression is taken, for example, the handle and the midline of the impression should be centered in the tray housing. If the impression midline is mistakenly shifted while the dental professional is taking the impression, and the intended centerline of, for example, the handle shifts to the left or right of the impression tray center (i.e., around the yaw axis, if the mouth of the housing were the nose of a plane), it will cause the model and possible articulation to be offset either to the left of right because the housing is designed to keep the tray with impression, articulator (if present), and dental modeling material, aligned. If the operator notices that the midline of the impression is not properly centered in the impression tray, and for example, the alignment yaw axis shifted left or right, this could be corrected by cutting into, or cutting off, the handle enclosure 1 from the tray housing (if the handle enclosure is present), and, whether the handle enclosure 1 is present or not, extending opening 101 laterally left or laterally right as necessary so that the handle can be positioned such that the midline of the impression is properly aligned with the midline of the casting housing.

Furthermore, the buccal nodules receptacles may be designed such that the tray can be moved laterally to compensate for midline discrepancies. For example, added depth of anterior receptacles towards the anterior, while maintaining the same width of receptacles of about 3 mm (from inferior to superior planes), will allow room for an operator to shift a tray handle left or right to achieve proper midline positioning.

In embodiments of the invention, sections of the enclosed embodiment of the anterior receptacle have perforated section(s) 201, for example, across the enclosed receptacle, or as an alternative, to the right and left lateral sides of the enclosure. The perforations allow sections adjacent to the enclosure to be easily removed by the operator so that the impression tray handle may be adjusted so the midline of the impression can be properly aligned with the midline of the casting housing. Additionally, in an embodiment of the invention, the casting housing may have at least one perforated edge, for example on the outside of the superior (202) or inferior section of the tray housing, which can be easily lifted and removed from the casting housing to allow for removal of the dental models after the curing and hardening process is completed by essentially sectioning the casting housing and allowing it to be separated from the cured/hardened dental models.

Embodiments of the system may further include a shaping and cutting mold (FIG. 3), where after obtaining a negative impression of a patient's dental anatomy in an impression tray, the impression tray is inserted into the shaping and cutting mold for identifying and removing excess impression material. Excess dental impression material may overflow on the mandibular or maxillary sides of a dual impression tray, for example, and may overflow to lingual or facial sides of a tray. The shaping and cutting mold may receive the tray's handle in a receptacle, and may further receive buccal nodule(s) in female receptacle(s) (4) if present on the impression tray. The operator cuts away unnecessary material, which could otherwise impede placement of the impression tray in the casting housing.

In embodiments of the invention, the casting housing may be rigid, reusable, flexible, or disposable, as needed. The tray housing may be made partly or wholly of various materials, including but not limited to ethyl vinyl acetate, acrylic resin, shellac, thermoplastic, silicone rubber, poly (vinyl acetate-ethylene) copolymer clear thermoplastic; polyurethane; or laminated thermoplastic, by way of example and not of limitation.

Impression trays, articulators, and base forming adapters of different brands and styles will fit into a casting housing of predetermined dimensions, leaving enough room for the impression material, a model forming base if desired, and the articulator if desired.

An impression tray will insert snugly into the female component of the preferred embodiment of this invention. One or more posterior perches points may also fit snugly and provide further posterior support to provide a more stable fit for supporting the tray while pouring up the impression, and maintain the stable fit and proper dimensions during the curing and hardening process. A snug fit ensures that the modeling material will be restricted from flowing into an enclosed tray handle receptacle (1), for example an anterior tray handle receptacle.

The articulator, or variables, can be added or removed in this invention to match the desired end goal of the dental professional and, since they are optional, provide numerous configurations to allow the dental professional to easily create the desired modeling combination of which there will be numerous possibilities. Possibilities include but are not limited to pouring up the impression(s) to create a minimal dental model base, pouring up the impression(s) to create tooth whitening models with tooth whitening dental model bases, pouring up the impression(s) to create study models with minimal dental model bases, pouring up the impression (s) to create study models with full maxillary and mandibular dental model bases, pouring up the impression(s) to create orthodontic models with full maxillary and mandibular dental model bases and articulate them.

As the modeling material is poured into the invention, the invention is designed so that the handle of the impression tray and any portion of the casting housing in which the impression tray is in contact with the casting housing wall can be held against a dental model vibrator in order to help reduce bubbles, voids, and defects in the dental model.

Due to the predetermined casting housing size, which may be further limited by blocking variables, for example, the remaining room there is for the modeling material which will result in creating models with a desired minimal base, minimal reservoir depth, dimensions, and configurations known, expected and customary, or useful, to various dental professionals. Among other purposes, dental professionals may desire the casting housing to efficiently aid in the preparation of but not limited to creating mouth guards, removable partial dentures, custom trays, orthodontic models, etc.

Figure 2:
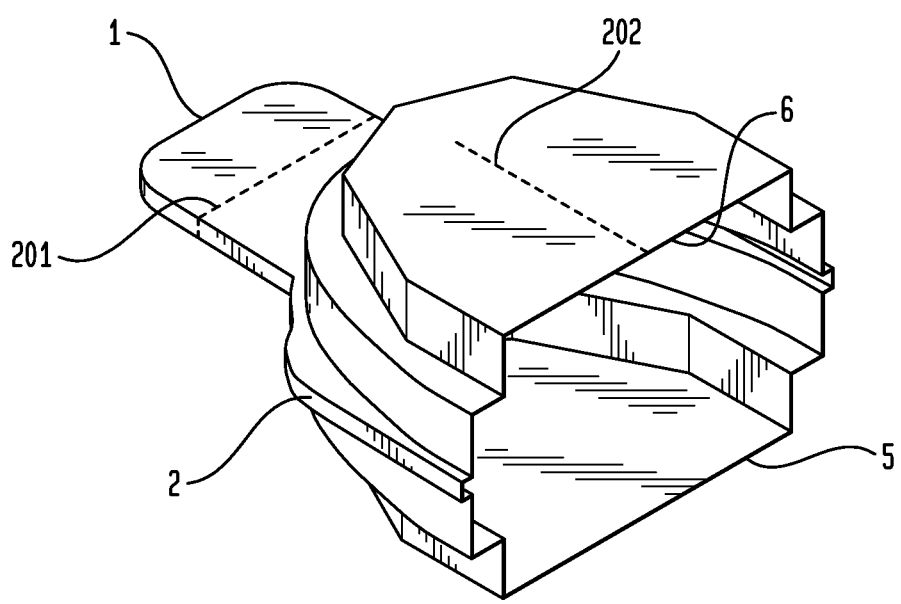
FIG. 2 is a view of the interior of an embodiment of the casting housing.

FIGS. 1 and 2 show embodiments of a casting housing, comprising a design that fits around the articulator, impression tray, and modeling material, leaving an opening for adding the modeling material. Since embodiments may be a single system, there are no seams to allow the material to flow out which provides solid, complete models. Further, for many dental impression trays incorporating buccal nodules and casting housings with receptacles for buccal nodules, the open back and a tight adaptation creates dental models without any voids, a benefit when using a dental modeling vibration unit to vibrate the modeling material into the former as it vibrates the bubbles away from the dental impression material and to the surface of the modeling material where it cannot interfere with replicating the desired oral anatomy.

Embodiments described herein show a few of the many different designs of this invention, however, there are many options for how many parts are used: single, 2-part, 3-part, etc, how the parts are sectioned: horizontally, vertically, off center, etc, whether there is one master former with custom adapters, several master formers of different dimensions to accommodate the desired outcome: minimal base, moderate base, etc, articulated/not articulated, etc, as well as where the modeling material enters the invention: from the back, top, bottom, multiple locations, etc.

A casting housing may optionally be comprised of a male superior or inferior component, e.g., a maxillary component, which component securely snaps into the female counterpart of, for example, a mandibular component in order to keep the tray, formers, and articulator secure while also providing a casting housing for the modeling material. Excess modeling material would be prevented from flowing outside of the housing by utilizing a modeling material catching trough that is created by tightly adapting the male component into the female component such that the modeling material cannot navigate into, through, and around the trough since the trough design is such that it catches and holds the modeling material.

As noted, the invention has a built in stand feature (FIG. 4) that holds the modeling material in the proper orientation after the modeling material has been vibrated into the impression so that the modeling material can completely set in the proper orientation.

Dental offices often take impressions using single arch or dual arch impression trays for many procedures including but not limited to: crowns, bridges, inlays, onlays, veneers, implants, application of therapeutics, whitening trays, mouthguards, nightguards, study models, orthodontic models, custom tray fabrication, removable prosthodontic appliance fabrication/repair, sleep/snore appliances, delivery of medications, customized scenarios, etc. Embodiments of the invention may be customized to meet these demands by creating a customizable system that allows the user to create the desired modeling system. Generally, embodiments of the invention allow creation of discrete dental models, to concomitantly creating a range of modular impressions.

Procedures made more efficient by embodiments of this invention include but are not limited to crowns, bridges, inlays, onlays, veneers, implants, whitening trays, mouthguards, nightguards, study models, orthodontic models, custom tray fabrication, removable prosthodontic appliance fabrication/repair, sleep/snore appliances, delivery of medications, customized scenarios, periodontic/orthodontic, endodontic, pedodontic, general dental, and prosthodontic procedures, removable prosthodontic appliance fabrication/repair, etc.

This invention may employ interchangeable adapters that allowing the accurate creation of the model base and/or articulation option desired including but not limited to:
i. Bleaching/Whitening trays
ii. Orthodontics
iii. Endodontics
iv. Prosthodontics
v. Periodontics
vi. Geriatrics
vii. Oncology
viii. Xerostomia
ix. Pedodontics
x. Delivery of therapeutic, medicaments, supplements, fluoride, antibacterial agents
xi. Study Models
xii. Crown and Bridge
xiii. Custom Trays
xiv. Nightguards
xv. Mouthguards
xvi. Snore/Sleep aids
xvii. Sleep apnea Aids
xviii. Custom dentistry/appliances/models/

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A dental casting system configured to duplicate at least a portion of a patient's dental anatomy, the system comprising:
   an impression tray configured to hold an at least one impression of a patient's oral anatomy;
   the impression tray configured to receive dental impression material;
   the impression tray further comprising a handle;
   a casting housing for receiving the impression tray,
   the casting housing comprising an at least one female receptacle formed to accept the impression tray handle,
   the at least one female receptacle holding the impression tray configured to hold the at least one impression of a patient's oral anatomy and the impression tray maintaining accurate dimensions of the oral environment, the at least one female receptacle also holding the casting housing during the dental modeling material hardening and curing process.

2. The system of claim 1, wherein the handle is an anterior handle and the casting housing receptacle is an anterior receptacle.

3. The system of claim 1, wherein the impression tray further comprises an at least one buccal nodule on the impression tray, and the casting housing further comprises at least one female receptacle for receiving the at least one buccal nodule on the impression tray.

4. The system of claim 1, wherein the casting housing further comprises opposing inferior and superior walls, wherein an interior border of the inferior and superior walls are between approximately 10 and 70 mm apart.

5. The system of claim 1, wherein the casting housing further comprises opposing inferior and superior walls, wherein an interior border of the inferior and superior walls are approximately 40 to 60 mm apart.

6. The system of claim 1, wherein the receptacle is enclosed by the casting housing.

7. The system of claim 1, wherein the housing further receives an articulator at a predetermined depth for registering a bite.

8. The system of claim 1, wherein the system further comprises a shaping and cutting mold, wherein the impression tray is inserted into the shaping and cutting mold for identifying and removing excess impression material on the impression tray, the shaping and cutting mold further comprising a stem receptacle.

9. The system of claim 7, the system further comprising a shaping and cutting mold element, where the impression tray is inserted into the shaping and cutting mold for identifying and removing excess impression material on the tray, the shaping and cutting mold further comprising a stem receptacle.

10. The system of claim 8, wherein the impression tray further comprises at least one buccal protrusion, the shaping and cutting mold further comprises at least one female receptacle for at least one buccal protrusion on the impression tray, and the casting housing further comprises at least one female receptacle for at least one buccal protrusion on the impression tray.

11. The system of claim 1, the casting housing further comprising at least two female receptacles for receiving at least two buccal nodules of an impression tray, and the casting housing further comprising a minimum depth from an anterior receptacle to a mouth of the reservoir of between about 40 mm and about 60 mm.

12. The system of claim 6, wherein the receptacle is an anterior stem receptacle, the anterior stem receptacle being enclosed around a stem of the impression tray.

13. The system of claim 12, further comprising an enclosure around a stem, wherein the enclosure further comprises at least one perforated edge.

14. The system of claim 1, further comprising a holder for receiving and securing the casting housing in a position so as to allow time for modeling material to set and reach full hardness while retaining an accurate replication of the oral environment.

15. The system of claim 1, wherein the casting housing holds dental impressions during the curing and hardening process, the casting housing is adapted to receive the impression tray, and the casting housing further comprises opposing inferior and superior walls having a predetermined interior aspect depth and a guide receptacle for receiving an impression tray handle.

16. The system of claim 1, wherein the casting housing further comprises at least one female positioning opening for receiving an at least one buccal protrusion of a dental tray.

17. The system of claim 1, wherein the interior aspect of the inferior and superior frame walls are between about 10 mm and about 80 mm apart.

18. The system of claim 1, the casting housing further comprising a minimum depth of a reservoir from a stem receptacle to the mouth of the casting housing of at least about 20 mm.

19. The system of claim 1, wherein the impression tray further comprises at least one posterior finger rest, and wherein the housing receives the finger rest.

20. The system of claim 1, wherein the casting housing is composed of a material selected from the group consisting of ethyl vinyl acetate, acrylic resin, shellac, thermoplastic, silicone rubber, poly (vinyl acetate-ethylene) copolymer thermoplastic; polyurethane; and laminated thermoplastic.

21. The system of claim 1, wherein the casting housing contains an at least one perforated edge.

22. The system of claim 1, further comprising an articulating device, where the articulating device is inserted into the housing for stably maintaining the impression for registering a bite, wherein the articulating device is received into the housing at a predetermined depth.

23. A dental casting system configured to duplicate at least a portion of a patient's dental anatomy, the system comprising:
   an impression tray configured to hold an at least one impression of a patient's oral anatomy;
   the impression tray configured to receive dental impression material;
   a casting housing for receiving the impression tray, and
   the impression tray maintaining accurate dimensions of the oral environment, the casting housing holding the impression tray during the dental modeling material hardening and curing process.

* * * * *